June 4, 1946.  R. E. BURK ET AL  2,401,334
PROCESS OF AROMATIZING SULPHUR-CONTAINING HYDROCARBONS
Filed Dec. 12, 1942

SULFUR-CONTAINING HYDROCARBON

TREATMENT WITH
SPENT AROMATIZING
CATALYST AT 200°
TO 850°C. TO
REMOVE SULFUR

TREATMENT WITH
AROMATIZING CATALYST
AT 800° TO 1200°F.

INVENTORS
ROBERT E. BURK
EVERETT C. HUGHES
BY
ATTORNEYS

Patented June 4, 1946

2,401,334

UNITED STATES PATENT OFFICE 2,401,334

PROCESS OF AROMATIZING SULPHUR-CONTAINING HYDROCARBONS

Robert E. Burk and Everett C. Hughes, Cleveland Heights, Ohio, assignors to The Standard Oil Company, Cleveland, Ohio, a corporation of Ohio Application December 12, 1942, Serial No. 468,812

13 Claims. (Cl. 196—52)

In aromatizing hydrocarbons by contacting with catalysts, it has been the experience of the art that the catalysts progressively lose their activity, and require regenerating. It has been observed that not only is coke deposited on the surface of the catalyst, but sulphur acts as a poison; and the amount of sulphur serving to deactivate such a catalyst is very much smaller than the amount of coke formed in aromatizing, and it is much more difficult to remove sulphur from the catalyst than to remove coke. In well-conducted aromatizing, sulphur is in fact more of a menace than coking of the catalyst. In accordance with the present invention, hydrocarbon stocks which contain sulphur may however be aromatized without jeopardy to the catalyst, and the procedure may be operated particularly advantageously without resort to expedients remote from aromatizing practice and equipment.

To the accomplishment of the foregoing and related ends, the invention, then, comprises the features hereinafter fully described, illustrated in the accompanying diagrammatic sketch and particularly pointed out in the claims, the following description setting forth in detail certain illustrative embodiments of the invention, these being indicative however, of but a few of the various ways in which the principle of the invention may be employed.

For the aromatizing, known or preferred aromatizing catalysts may be applied, these involving mostly metallic compounds of the fifth, sixth and seventh periodic groups, and we particularly prefer a catalyst of co-precipitated gel-type oxides with 18–30 mol per cent of chromium oxide and 70–82 mol per cent of aluminum oxide, or with equivalent inclusion of 1 to 15 mol per cent of oxide of copper or of tin, etc., as in U. S. Patents Nos. 2,236,514, 2,270,503 and 2,280,060. The stock to be aromatized may be a naphtha, or more or less isolated or individual hydrocarbons, as known or preferred. We have found that aromatizing catalysts, and notably such efficient catalysts as afore-mentioned, when spent or undesirably low in activity for aromatizing, are advantageous for use on a stock for reducing the sulphur content of the hydrocarbons, i. e. desulphurizing them before bringing into contact with the aromatizing catalyst. With particular convenience, the operations may be carried out such as to pre-heat the stock and simultaneously desulphurize, enroute to the aromatizing bed. Thus, the feed stock, as vapor, may be brought into contact with the desulphurizing catalyst, which may be a spent aromatizing catalyst, one that is no longer very active even after regeneration or one that merely needs regeneration to restore activity, the catalyst zone for desulphurizing being maintained at a temperature of 200–850° F. If desired, hydrogen or hydrogen-containing gases may be fed simultaneously. In addition to the catalysts already mentioned, desulphurizing may be carried out with such related catalysts as alumina, chromium sesqui-oxide, natural or synthetic, acid treated aluminum silicates or clays, bauxite, oxide or carbonate of magnesia, oxides of iron or nickel with or without supports such as calcium sulphate, alumina, etc., in some cases.

Catalysts which absorb organic sulphur are in general preferable. When they begin to convert organic sulphur to hydrogen sulphide and allow it to escape, they should be regenerated. Two or more catalyst beds may be used in series, for example one which is superior for decomposing sulphur compounds and a succeeding one which is superior for absorbing the products from decomposition. For instance, as a first contact bed iron sulphide, bauxite, clays, zinc sulphide, oxides and/or sulphides such as those of Mo, W, Fe, Ni, Co and Cu, and as the subsequent contact bed alumina, iron oxide, etc.

In some instances operation may be carried on by first subjecting the hydrocarbon to a desulphurizing catalyst, then cooling the products and separating hydrogen sulphide, and then feeding the stock to the aromatizing zone.

If hydrogen is employed during the desulphurizing step, pressures of 50–800 pounds per square inch may be used. To regenerate the desulphurizing catalyst, it may be treated with air or oxygen-containing gas, followed by passing hydrogen through the catalyst bed.

In the aromatizing step, the temperature in the aromatizing zone should be 800–1200° F., and the pressure may be atmospheric or up to 500 pounds per square inch. Where desired, hydrogen or hydrogen-containing gases may be supplied.

As an example: A naphtha from Illinois petroleum containing 0.028 per cent sulphur was passed over a spent aromatizing catalyst consisting of co-precipitated gel type oxide of alumina 80 mol per cent and oxide of chromium 20 mol per cent, at a flow rate of 1.2 volumes of liquid per volume of catalyst per hour, the temperature being around 730° F. and pressure 100 pounds per square inch. The product of this stage of treatment was sweet and had a total sulphur content of 0.003 per cent, and the Kattwinkel test was 7 and bromine number 2.1. The naphtha was then passed through the aromatizing zone, over fresh catalyst of the same composition as the foregoing, at a flow rate of 3.1 v. v. h. and mol ratio of $H_2$: naphtha of 3:3, temperature 1060° F. and pressure 350 pounds per square inch. Operating in sequence to the desulphurizing zone thus, the aromatizing catalyst showed a high level of activity at 11½ hours, whereas in a comparative identical run with the same naphtha stock passed directly into the aromatizing zone instead of first through the desulphurizing zone, the aromatizing catalyst was down in its activity after only six hours on stream.

Other modes of applying the principle of the invention may be employed, change being made as regards the details described, provided the features stated in any of the following claims, or the equivalent of such, be employed.

We therefore particularly point out and distinctly claim as our invention:

1. A process of aromatizing sulphur-containing hydrocarbons, which comprises pre-heating and simultaneously desulphurizing naphtha by contacting with a spent catalyst of co-precipitated gel type chromium oxide 18–30 mol per cent and aluminum oxide 70–82 mol per cent, at a temperature of 200–850° F., and finally aromatizing the naphtha by contacting with an active catalyst of co-precipitated gel type chromium oxide 18–30 mol per cent and aluminum oxide 70–82 mol per cent.

2. A process of aromatizing sulphur-containing hydrocarbons, which comprises pre-heating and simultaneously desulphurizing naphtha by contacting with a spent catalyst of co-precipitated gel type chromium oxide 18–30 mol per cent and aluminum oxide 70–82 mol per cent, at a temperature of 200–850° F., separating hydrogen sulphide, and finally aromatizing the naphtha by contacting with an active catalyst of co-precipitated gel type chromium oxide 18–30 mol per cent and aluminum oxide 70–82 mol per cent.

3. A process of aromatizing sulphur-containing hydrocarbons, which comprises pre-heating and simultaneously desulphurizing naphtha by contacting with a spent aromatizing catalyst, and finally aromatizing the naphtha by an active catalyst of co-precipitated gel type chromium oxide 18–30 mol per cent and aluminum oxide 70–82 mol per cent.

4. A process of aromatizing sulphur-containing hydrocarbons, which comprises pre-heating and simultaneously desulphurizing naphtha by contacting with a spent aromatizing catalyst, separating hydrogen sulphide, and finally aromatizing the naphtha by an active catalyst of co-precipitated gel type chromium oxide 18–30 mol per cent and aluminum oxide 70–82 mol per cent 5. A process of aromatizing sulphur-containing hydrocarbons, which comprises desulphurizing naphtha by contacting with a spent aromatizing catalyst, and finally aromatizing the naphtha by contacting with an active aromatizing catalyst at a higher temperature than is employed in said desulfurization and within the range of 800–1200° F., the difference in temperature between said desulfurization and aromatization being of the general order of about 330° F.

6. A process of aromatizing sulphur-containing hydrocarbons, which comprises pre-heating and simultaneously desulphurizing an aromatizable hydrocarbon by contacting with a spent catalyst of co-precipitated gel type chromium oxide 18–30 mol per cent and aluminum oxide 70–82 mol per cent, at a temperature of 200–850° F., and finally aromatizing the aromatizable hydrocarbon by contacting with an active catalyst of co-precipitated gel type chromium oxide 18–30 mol per cent and aluminum oxide 70–82 mol per cent.

7. A process of aromatizing sulphur-containing hydrocarbons, which comprises pre-heating and simultaneously desulphurizing an aromatizable hydrocarbon by contacting with a spent catalyst of co-precipitated gel type chromium oxide 18–30 mol per cent and aluminum oxide 70–82 mol per cent, at a temperature of 200–850° F., separating hydrogen sulphide, and finally aromatizing the aromatizable hydrocarbon by contacting with an active catalyst of co-precipitated gel type chromium oxide 18–30 mol per cent and aluminum oxide 70–82 mol per cent.

8. A process of aromatizing sulphur-containing hydrocarbons, which comprises pre-heating and simultaneously desulphurizing an aromatizable hydrocarbon by contacting with a spent aromatizing catalyst, and finally aromatizing the aromatizable hydrocarbon by an active catalyst of co-precipitated gel type chromium oxide 18–30 mol per cent and aluminum oxide 70–82 mol per cent.

9. A process of aromatizing sulphur-containing hydrocarbons, which comprises pre-heating and simultaneously desulphurizing an aromatizable hydrocarbon by contacting with a spent aromatizing catalyst, separating hydrogen sulphide, and finally aromatizing the aromatizable hydrocarbon by an active catalyst of co-precipitated gel type chromium oxide 18–30 mol per cent and aluminum oxide 70–82 mol per cent.

10. A process of aromatizing sulphur-containing hydrocarbons, which comprises desulphurizing hydrocarbons, which comprises desulphurizing an aromatizable hydrocarbon by contacting with a spent aromatizing catalyst, and finally aromatizing the aromatizable hydrocarbon by contacting with an active aromatizing catalyst at a higher temperature than is employed in said desulfurization and within the range of 800–1200° F., the difference in temperature betwen said desulfurization and aromatization being of the general order of about 330° F.

11. A process of aromatizing sulphur-containing hydrocarbons, which comprises desulphurizing sulphur-containing aromatizable hydrocarbons by contacting with a spent aromatizing catalyst at a temperature of 200 and 850° F., and then aromatizing the above treated aromatizable hydrocarbons by contacting with an active aromatizing catalyst at a temperature higher than that used in the desulphurizing and within the range of 800 to 1200° F., the difference in temperature between said desulfurizatiton and aromatization being of the general order of about 330° F.

12. A process of aromatizing sulphur-containing hydrocarbons, which comprises desulphurizing sulphur-containing aromatizable hydrocarbons by contacting with a spent catalyst of co-precipitated gel-type chromium oxide 18–30 mol per cent and aluminum oxide 70–82 mol per cent, and then aromatizing the above treated aromatizable hydrocarbons by contacting with an active catalyst of co-precipitated gel-type chromium oxide 18–30 mol per cent and aluminum oxide 70–82 mol per cent.

13. A process of aromatizing sulphur-containing hydrocarbons, which comprises desulphurizing sulphur-containing aromatizable hydrocarbons by contacting with a spent catalyst of co-precipitated gel-type chromium oxide 18–30 mol per cent and aluminum oxide 70–82 mol per cent at a temperature of 200 to 850° F., separating any hydrogen sulphide that may be formed, and then aromatizing the above treated aromatizable hydrocarbons by contacting with an active catalyst of co-precipitated gel-type chromium oxide 18–30 mol per cent and aluminum oxide 70–82 mol per cent at a temperature higher than that used in the desulphurizing and within the range of 800 to 1200° F.

ROBERT E. BURK.
EVERETT C. HUGHES.